(12) United States Patent
Mäkinen

(10) Patent No.: US 6,237,080 B1
(45) Date of Patent: May 22, 2001

(54) EXECUTABLE PROGRAMS

(75) Inventor: Rauno Mäkinen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/161,860

(22) Filed: Sep. 28, 1998

(30) Foreign Application Priority Data

Sep. 29, 1997 (FI) .................................................. 973826

(51) Int. Cl.$^7$ ............................... G06F 9/30; G06F 9/318; G06F 9/40

(52) U.S. Cl. ........................... 712/41; 712/210; 712/248; 711/102; 711/103

(58) Field of Search ..................................... 379/387, 903, 379/914; 455/418, 551; 712/41, 24, 214, 25, 215, 216, 23, 219, 42, 213, 210, 248; 713/200; 714/36; 711/102, 169, 103

(56) References Cited

U.S. PATENT DOCUMENTS

| 5,315,638 | 5/1994 | Mukari ................................... 379/58 |
| 5,619,698 | 4/1997 | Lillich et al. ........................ 395/710 |
| 5,671,413 | 9/1997 | Shipman et al. ..................... 395/652 |
| 5,799,165 | * 8/1998 | Favor et al. .......................... 712/214 |
| 5,953,502 | * 9/1999 | Helbig, Sr. ............................ 713/220 |
| 6,044,450 | * 3/2000 | Tsuhima et al. ....................... 712/24 |

FOREIGN PATENT DOCUMENTS

| 55-131848 | 10/1980 | (JP) . |
| WO 94/19768 | 1/1994 | (WO) . |
| WO 95/27244 | 10/1995 | (WO) . |

OTHER PUBLICATIONS

Patent Abstracts Of Japan—Publication No. 07248921, vol. 96, No. 1, 1996.
"Algorithm To Allow A Computer System's BootROM In Compressed Form", IBM Technical Disclosure Bulletin, vol. 37, No. 4B, pp 571–572, 1994.
"Blockweise Loeschbar", Elektronik, vol. 40, No. 13, p. 32, 1991.
"Executing Compressed Programs on An Embedded RISC Architecture", Wolfe et al., SIGMICRO Newsletter, vol. 23, No. 1–2, 1992.
"Arms System Structure", S. Furber, Addison–Wesley, ISBN 0–201–40352–8, 1996.
Japanese Patent Publication No.: 09/247304, English translation of the abstract, Sep. 19, 1997.
Finnish Office Action of Application 973826, Dec. 12, 1998.

* cited by examiner

Primary Examiner—Daniel H. Pan
(74) Attorney, Agent, or Firm—Perman & Green, LLP

(57) ABSTRACT

A computer having a reduced instruction computer (RISC) architecture has a RISC central processing unit (CPU)(1) coupled to a RAM memory (3) and to a flash ROM memory (4). A set of compressed operating instructions (6,8), including a subset defining a compression method (8), are stored in the flash ROM (4) together with a set of uncompressed instructions (7) defining a compression algorithm. Upon booting of the computer, the uncompressed instructions (7) are read from the ROM (4) by the CPU (1) which then also reads the compressed instructions (6,8), decompresses them according to the decompression process (7), and writes the decompressed instructions (6',8') to the RAM (3). The compressed instructions (6,8) can be dynamically altered by the CPU (1), by generating an altered set of uncompressed instructions, compressing these in accordance with the now decompressed compression method (8'), and writing these to the flash ROM (4).

13 Claims, 2 Drawing Sheets

EXECUTABLE PROGRAMS

FIELD OF THE INVENTION

The present invention relates to executable programs and in particular to a method and apparatus for storing and using executable programs.

BACKGROUND OF THE INVENTION

At the heart of most modern electronic devices is a microprocessor or central processing unit which operates in accordance with a set of software operating instructions which together form an executable program. The instructions are stored in a digital memory which may be internal to the microprocessor or, as is more usually the case, externally connected to the microprocessor. The set of operating instructions generally define the basic input/output system (BIOS) of the microprocessor together with device drivers, libraries, and user applications.

Software instructions defining the basic operation of a microprocessor are usually stored in non-volatile read only memory (ROM). Until recently, the preferred choice for storing operating instructions was UV light erasable programmable read only memory. More recently however, the preferred choice for storing operating instructions, especially in embedded devices (e.g. mobile phones, personal digital assistants, etc) has become flash ROM. Flash ROM is both non-volatile and electrically erasable and is used, to a large extent, because it can be programmed following assembly of the PCB containing the flash ROM oar of the completed device. A further advantage is that it is possible to upgrade operating instruction stored in the flash ROM at some future date.

Compared to conventional ROM, flash ROM remains expensive. There therefore exists a desire to reduce the amount of flash ROM used in individual products. Furthermore, accessing flash ROM is relatively slow, significantly reducing the performance of electronic devices. Conventional computer architectures rely upon a complex instruction set computer (CISC) architecture. This utilises a large number (e.g. 1000) of instructions which define very specific tasks. The instructions are of variable length and are decoded by the computer's CPU before execution. There is described in Japanese non-examined patent publication no. 55-131848 a data processing unit which comprises a central processing unit, a main memory unit, and an external memory unit. A compressed program is stored in the external memory unit and, before commencing processing operations, the compressed program is read from the external memory unit in blocks and decompressed. The decompressed program is then written to the main memory unit. However, the compression ratio which can be achieved with CISC code is relatively low and it is not believed that the disclosure of JP-131848 has been widely used.

SUMMARY OF THE INVENTION

The present invention flows from the recognition that the new generation of reduced instruction set computers (RISC) make use of a much reduced set of instructions. In addition, RISC architectures have a generally fixed length instruction size, allowing the use of hard-wired decoding logic.

According to a first aspect of the present invention there is provided a method of operating apparatus having a central processing unit (CPU) with a reduced instruction set computer (RISC) architecture, and a read only memory (ROM), the method comprising reading a set of compressed RISC operating instructions from the ROM into the CPU, decompressing the compressed instructions in the CPU, and thereafter operating the apparatus in accordance with the decompressed instructions.

The present invention makes it possible to make a considerable saving in the amount of ROM memory required for storing RISC operating instructions for a central processing unit. As the set of different possible RISC instructions is relatively small (e.g. around 250) compared to the total number of instructions (e.g. around 1000,000), instructions tend to be repeated many times and therefore the degree of compression which can be achieved is high. Although extra RAM may be required, a considerable cost saving may be achieved where expensive ROM is replaced by cheap RAM. Furthermore, manufacturing times may be reduced as it only becomes necessary to write a relatively short program to the ROM memory, rather than a long uncompressed program.

According to a second aspect of the present invention there is provided a method of operating apparatus having a central processing unit (CPU) and a read only memory (ROM), the method comprising reading a set of compressed operating instructions from the ROM into the CPU, decompressing the compressed instructions in the CPU, and thereafter operating the apparatus in accordance with the decompressed instructions, the method further comprising generating one or more replacement or additional compressed instructions in the CPU and writing the compressed instruction(s) to the ROM.

The above second aspect of the present invention makes it possible to amend the stored compressed instructions in a dynamic manner. This may, for example, allow a user to configure the computer according to his specific needs.

Preferably, the method comprises the step of reading a set of operating instructions from the ROM into the CPU, which instructions define a program for compressing said replacement or additional instruction(s). More preferably, the instructions defining the compression program form part of said set of compressed operating instructions.

Preferably, the method of the above first or second aspect of the invention comprises writing the decompressed instruction set to a random access memory (RAM). Thereafter, the decompressed instructions are read from the RAM by the CPU. It is noted that RAM typically offers high access speeds compared to slow (e.g. flash) ROM memory, giving a significant increase in system performance. In this case, increased speed also offers reduced power consumption compared to systems which use slow ROM memory and in which power is consumed even when the system is waiting to access the ROM.

According to a third aspect of the present invention there is provided apparatus having a central processing unit (CPU) a reduced instruction set computer (RISC) architecture, and a read only memory (ROM), there being stored in the ROM a set of compressed RISC operating instructions, the CPU being arranged in use to read the compressed instructions from the ROM, to decompress these instructions, and subsequently to operate the apparatus in accordance with the decompressed instructions.

According to a fourth aspect of the present invention there is provided apparatus comprising a central processing unit (CPU), a read only memory (ROM), and a set of compressed operating instructions stored in the ROM, the CPU being arranged in use to read the compressed instructions from the ROM, decompress the compressed instructions, and thereafter operate the apparatus in accordance with the decompressed instructions, the apparatus being further arranged in use to compress replacement or additional operating instructions and to write these compressed instructions to the ROM.

Preferably, said ROM memory is flash ROM memory.

Preferably, the apparatus comprises a random access memory which, in use, is arranged to store the operating instructions following decompression by the CPU.

Apparatus according to the above third and fourth aspects of the invention may advantageously be incorporated into mobile communication devices such as mobile telephones and combined mobile telephone/personal digital assistants.

BRIEF DESCRIPTION OF THE DRAWINGS a better understanding of the present invention and in order to show how the same may be carried into effect reference will now be made, by way of example, the accompanying drawings, in which.

DETAILED DESCRIPTION

Figure 1:
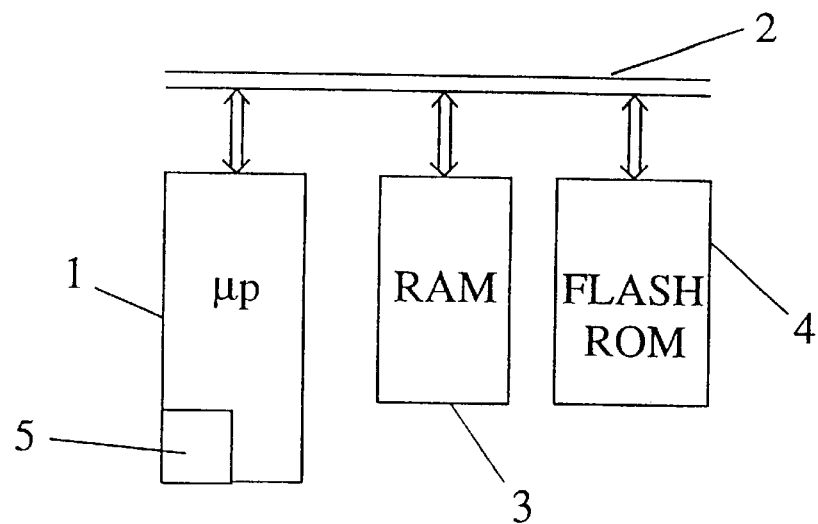
FIG. 1 shows in block diagram form the architecture of a simple computer.

A much simplified block diagram of a computer is illustrated in FIG. 1. The computer comprises a RISC based microprocessor 1 with an internal RAM cache 5. The microprocessor 1 may be, for example, an ARM9TDMI (Trade Mark of Advanced RISC Machines, UK) microprocessor coupled to a parallel bus 2. Also coupled to the bus 2 are a RAM memory 3 (for example SDRAM) and a flash ROM memory 4. A detailed description of the ARM TM system architecture and of RISC is given in "ARM System Architecture", Steve Furber, Addison Wesley, ISBN 0-201-40352-8. However, a feature of RISC is that it employs code which tends to contain a few operands repeated many times. Furthermore, these operands and register/address identifications tend to be of a fixed length.

The flash ROM 4 is used to store a set of RISC operating instructions which define the basic input/output system (BIOS) of the microprocessor as well as the device drivers, libraries, and user applications. The instructions are in compressed form, having previously been compressed using the Pkzip compression program. The compressed instructions occupy considerably less flash ROM space than would the corresponding uncompressed instructions, e.g. ½ to ⅕ of the memory space. Such a high compression ratio results from the particular structure of RISC instructions.

Figure 2:
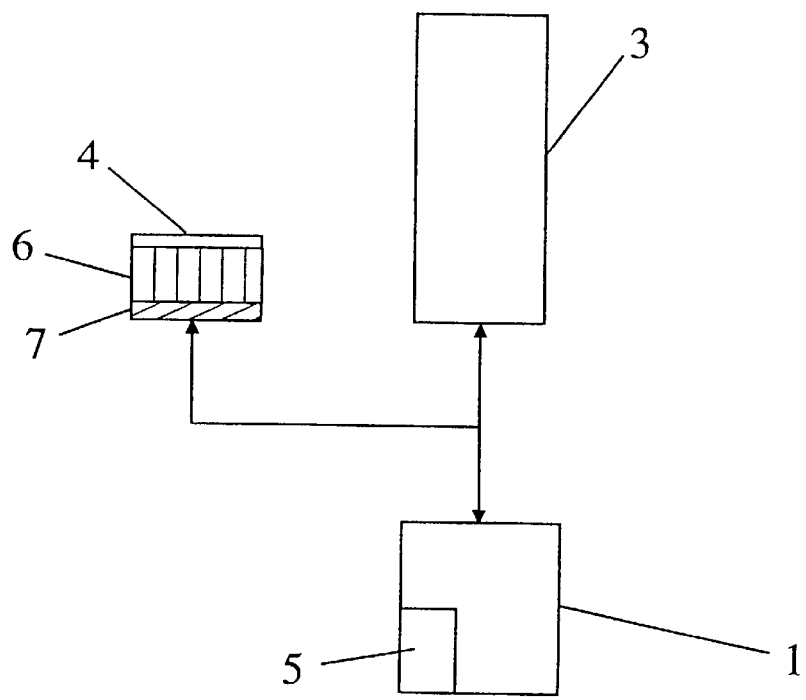
FIG. 2 shows a memory map of the computer of FIG. 1 prior to booting the computer, where the memory stores a set of operating instructions in accordance with a first embodiment of the present invention.

In order to enable the microprocessor 1 to decompress the stored compressed instructions, the flash ROM 4 additionally stores a set of instructions, in uncompressed form, which define the Pkzip decompression program. FIG. 2 shows a memory map of the ROM 4 prior to booting the computer, where a part of the memory space is occupied by the compressed instructions 6 and a part is occupied by the uncompressed Pkzip instructions 7. In FIG. 2, the ROM 4 is shown coupled to the microprocessor 1, as is the RAM 3 which at this stage remains empty.

Figure 3:
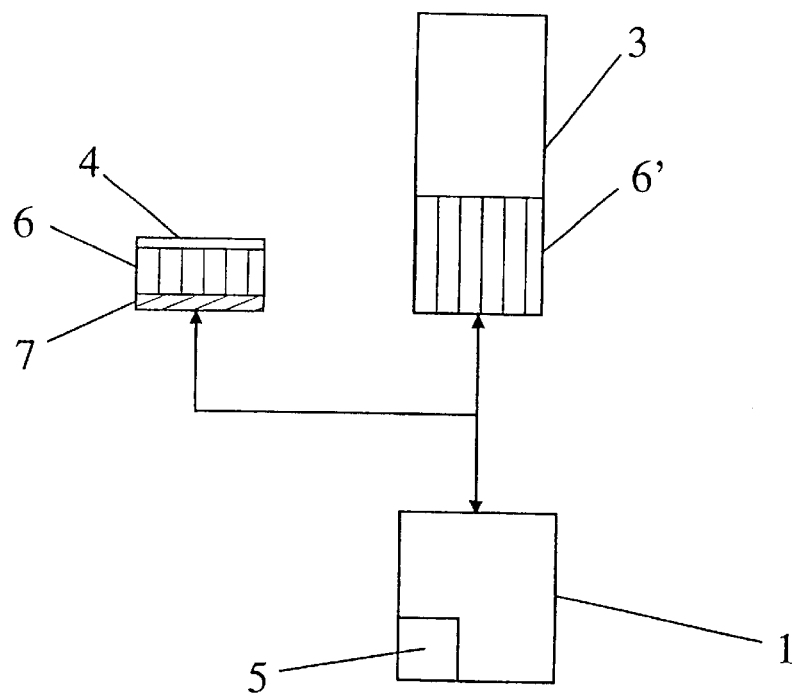
FIG. 3 shows the memory map of FIG. 2 after booting of the computer.

Upon booting of the computer, the microprocessor 1 is directed by hardwired logic to read the first instruction of the decompressed instruction set 7, from the ROM 4. Thereafter the microprocessor is directed, by the decompressed set, to read and decompress the compressed instruction set 6. The expanded instruction set 6' is then stored in the RAM 3 as shown in FIG. 3. The last operation that the set of decompression instructions perform is to cause the microprocessor 1 to jump to the first instruction in the decompressed code. Thereafter, the computer is operated in accordance with the decompressed operating instructions 6'.

It will be appreciated that the operating system of the computer may be altered by directly accessing the flash ROM 5 to erase and/or rewrite compressed instructions 6 stored therein. However, in some circumstances it may be desirable for the end-user to be able to alter the compressed operating instructions 6, or indeed for the computer itself to be able to 'dynamically' alter the instructions. To this end, the Pkzip compression method may also be stored in the flash ROM 4.

Figure 4:
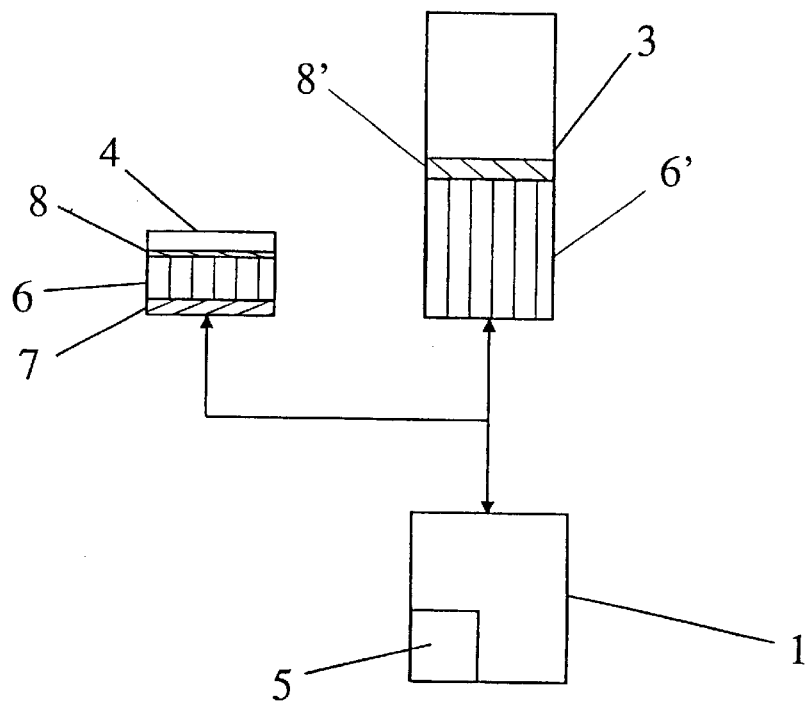
FIG. 4 shows a memory map of the computer of FIG. 1 prior to booting of the computer, where the memory stores a set of operating instructions in accordance with a second embodiment of the present invention.

In order to reduce memory requirements, the corresponding Pkzip instructions may be stored in compressed form 8 as illustrated in FIG. 4. During booting, the compressed Pkzip instructions 8 are read from the flash ROM 4 by the microprocessor 1, decompressed, and stored in the RAM 3 as decompressed instructions 8' together with the decompressed operating instructions 6' (FIG. 4). Alternatively, the compressed Pkzip instructions 8 may only be read from the flash ROM 4, and subsequently decompressed, when a specific request is made to alter the compressed instructions 6,8. In either case, the microprocessor 1 employs the decompressed Pkzip method to compress an amended version of the operating instructions 6',8' and writes the compressed instructions to the corresponding areas of the flash ROM.

It is noted that the compression ratio is maximised when the entire set of operating instructions 6,8 are compressed as a single 'unit'. However, it is also possible to compress the instructions in smaller sub-units, in which case only those units which have been amended need be compressed and written to the flash ROM 4.

It will be appreciated by the person of skill in the art that other modifications may be made to the embodiments described above without departing from the scope of the present invention. For example, compression algorithms other than Pkzip may be used, including Gzip-9, Zoo-a, and Arj-a. Compression methods may also be optimised for ARM (Trade Mark) processors.

What is claimed is:

1. A method of operating apparatus having a central processing unit (CPU) with a reduced instruction set computer (RISC) architecture, and a read only memory (ROM), the method comprising the steps of:

storing compressed RISC operating instructions in the ROM, reading compressed RISC operating instructions from the ROM into the CPU, decompressing the compressed instructions in the CPU, obtaining an operating system of the compressed RISC operating instructions, and thereafter operating the apparatus in accordance with the operating system.

2. A method according to claim 1, further comprising writing the decompressed instructions to a random access memory (RAM) and thereafter reading the decompressed instructions from the RAM by the CPU.

3. A method of operating apparatus having a central processing unit (CPU) and a read only memory (ROM), the method comprising the steps of:

reading compressed operating instructions from the ROM into the CPU, decompressing the compressed instructions in the CPU, and thereafter operating the apparatus in accordance with the decompressed instructions, generating one or more replacement or additional compressed instruction(s) in the CPU, and writing the one or more replacement or additional compressed instruction(s) to the ROM.

4. A method according to claim 3 further comprising the step of reading a subset of compressed operating instructions from the ROM into the CPU, which subset of compressed operating instructions defines a program for compressing said one or more replacement or additional compressed instruction(s).

5. A method according to claim 4, wherein the subset of compressed operating instructions forms part of said compressed operating instructions being stored in the ROM.

6. Apparatus having a central processing unit (CPU) with a reduced instruction set computer (RISC) architecture, and a read only memory (ROM), there being stored in the ROM compressed RISC operating instructions, the CPU being arranged in use to read compressed instructions from the ROM, to decompress the read compressed instructions, and subsequently to operate the apparatus in accordance with read decompressed instructions.

7. Apparatus according to claim 6, wherein said ROM comprises flash ROM memory.

8. Apparatus according to claim 6, further comprising a random access memory (RAM) which, in use, is arranged to store the decompressed operating instructions following decompression by the CPU.

9. Apparatus comprising a central processing unit (CPU), a read only memory (ROM), and compressed operating instructions stored in the ROM, the CPU being arranged in use to read compressed operating instructions from the ROM, decompress the read compressed operating instructions to decompressed operating instructions, and thereafter operate the apparatus in accordance with the decompressed operating instructions, the apparatus being further arranged in use to compress replacement or additional operating instructions and to write replacement or additional operating compressed instructions to the ROM.

10. Apparatus according to claim 9, wherein said ROM comprises flash ROM memory.

11. Apparatus according to claim 9 further comprising a random access memory (RAM) which, in use, is arranged to store the decompressed operating instructions following decompression by the CPU.

12. A mobile communication device comprising;
    a central processing unit (CPU) with a reduced instruction set computer (RISC) architecture,
    compressed operating instructions, and
    a read only memory (ROM) for storing the compressed operating instructions,
    wherein the CPU is arranged in use to read compressed operating instructions from the ROM, to form an operating system using the read compressed operating instructions and subsequently to operate the apparatus in accordance with the operating system.

13. A mobile communication device comprising:
    a central processing unit (CPU),
    compressed operating instructions, and
    a read only memory (ROM) for storing the compressed operating instructions,
    the CPU being arranged in use to read the compressed operating instructions from the ROM, decompress the compressed operating instructions to decompressed operating instructions, and thereafter to operate the apparatus in accordance with the decompressed operating instructions,
    the apparatus being further arranged in use to compress replacement or additional operating instructions and to write the replacement or additional compressed operating instructions to the ROM.

* * * * *